July 28, 1964 M. G. ANDERSON ETAL 3,142,597
PROCESS FOR MAKING PNEUMATIC TIRES
Filed May 29, 1961 3 Sheets-Sheet 1

INVENTORS
MALCOLM G. ANDERSON
JOSEPH S. HAWKES
BY
J. B. Holden
ATTORNEY

July 28, 1964  M. G. ANDERSON ETAL  3,142,597
PROCESS FOR MAKING PNEUMATIC TIRES
Filed May 29, 1961  3 Sheets-Sheet 2

INVENTOR.
MALCOLM G. ANDERSON
JOSEPH S. HAWKES
BY J. B. Holden
ATTORNEY

United States Patent Office 3,142,597
Patented July 28, 1964

3,142,597
PROCESS FOR MAKING PNEUMATIC TIRES
Malcolm G. Anderson, Hudson, and Joseph S. Hawkes, Cuyahoga Falls, Ohio, assignors to The Goodyear Tire & Rubber Company, Akron, Ohio, a corporation of Ohio
Filed May 29, 1961, Ser. No. 113,331
5 Claims. (Cl. 156—123)

This invention relates in general to a resilient tire for vehicles and a method of making it and, more particularly, to a pneumatic or semi-pneumatic tire, useful for a wide variety of applications, such as scooters, tricycles, wagons, lawnmowers, wheelbarrows, carts, and the like, which require low pressure tires.

An object of the invention is to provide a tire and the method of making the same so that it can be produced on a mass production basis at a fraction of the cost at present of fabric reinforced pneumatic tires.

A further object of the invention is to provide a tire of the character described in which the tire is made of a plurality of pieces of rubber which may be formed by economical extruding operations, which pieces are simultaneously stitched together in a single operation to form a unitary tire.

Other objects of the invention will become apparent from the description when read in connection with the accompanying drawings in which.

Figure 1:
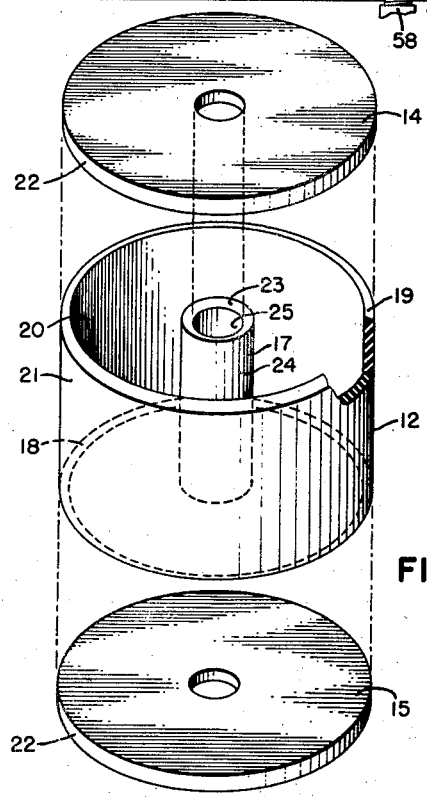
FIG. 1 is an exploded isometric view of the tire of this invention prior to curing.
Figure 2:
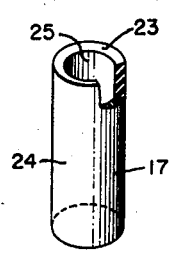
FIG. 2 is an isometric view of one element of the tire of this invention.
Figure 7:
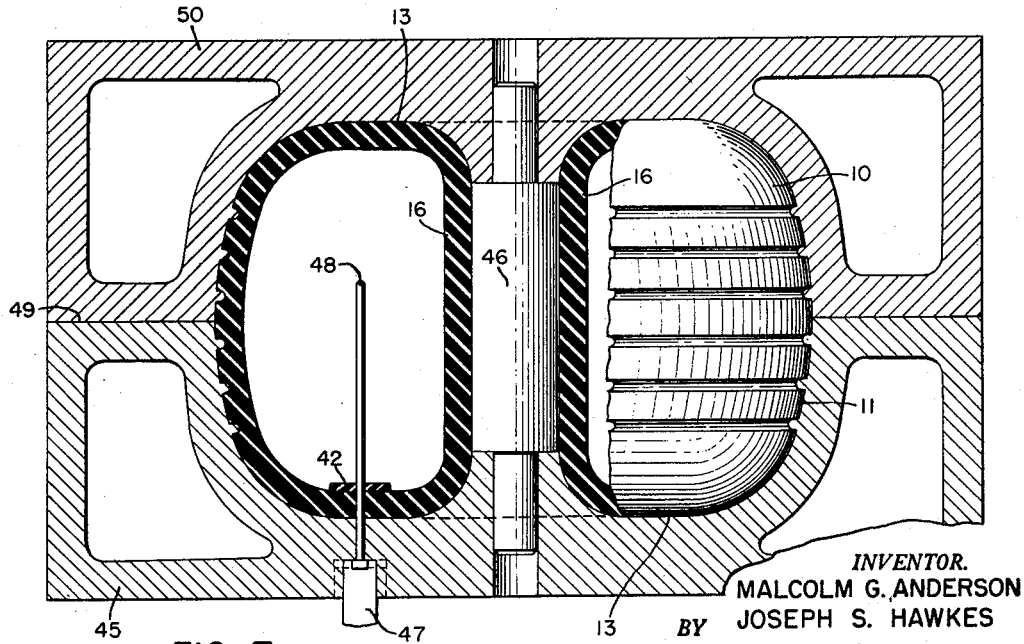
FIG. 7 is a view similar to FIG. 6 showing the tire curing mold in closed position.

Referring to FIG. 1 of the drawings, the preferred form of the uncured or green tire of this invention is shown in an exploded isometric view prior to curing. The cured tire 10 is shown in FIG. 7 of the drawings. In the preferred form, the tire is formed of a plurality of pieces of rubber, preferably from 1/8 to 3/8 inch in thickness, each of which forms a component of the finished tire 10. The tread 11 is formed by a piece of rubber 12 of cylindrical shape. The sidewalls 13 are formed by ring-shaped pieces 14 and 15 and the base portion 16 is formed by a cylindrical piece 17. The cylindrical pieces 12 and 17 may be formed by continuously extruding tubes of the desired diameters in a conventional extruder and cutting lengths from the tubes to the required dimension. The peripheral edges 18 and 19 of the piece 12 are skived or cut at an angle so that the axial length of the cylindrical piece 12 at the internal surface or diameter 20 is substantially greater than the axial length at the external surface or diameter 21. The sidewall pieces 14 and 15 may be die cut from extruded sheets and are generally ring-shaped in configuration with a circular hole centrally located and concentrically disposed relative to the peripheral edge 22 of each ring.

The rubber piece 17 forming the base 16 of the tire has a configuration similar to that of the cylindrical piece 12 except that the external diameter thereof is substantially smaller. The ends 23 of cylindrical piece 17 are each skived or beveled at an angle so that the axial length of the external surface or diameter 24 is greater than the axial length of the internal surface or diameter 25.

As indicated, all of the component pieces of the tire are made of rubber, or a solid elastomeric vulcanizable natural or synthetic compound, which in the unvulcanized state is tacky. The pieces 12, 14, 15, and 17 may also be made with a rubber having certain additives mixed therein which enhance certain properties of the rubber. For example, various abrasive materials may be mixed into the rubber compound from which the tread piece 12 is made to increase traction. Short lengths of textile or metallic filaments in an amount of 10 percent by volume may be mixed therein to increase the cut resistance of the tread. Short lengths of textile or metallic filaments may also be mixed into the rubber forming the sidewall pieces 14 and 15 to increase the modulus thereof and produce a tire which will hold its molded shape more readily.

Figure 3:
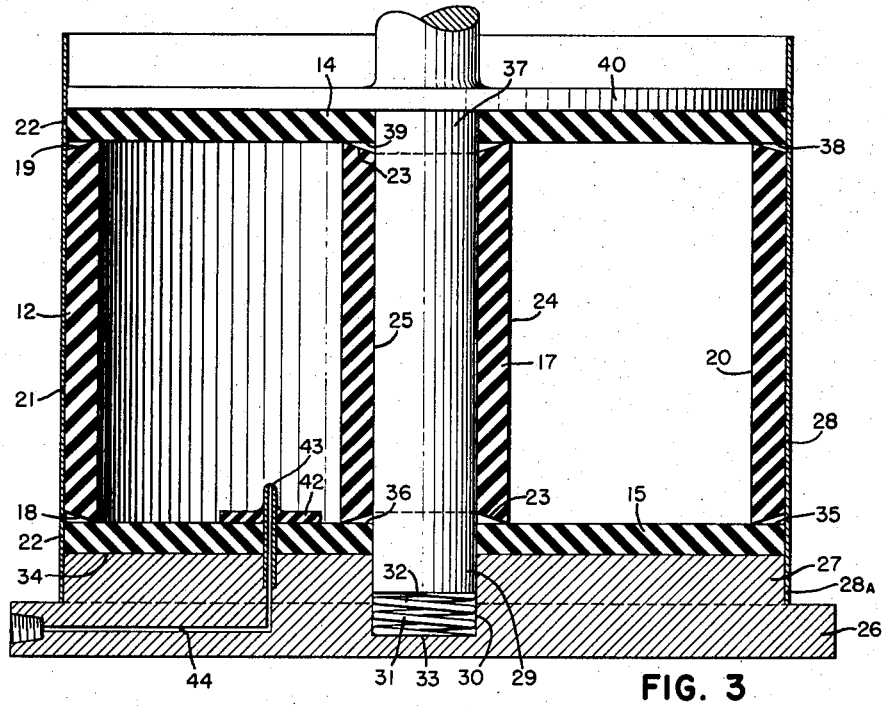
FIG. 3 is a vertical sectional view of an apparatus for assembling the tire of this invention.
Figure 4:
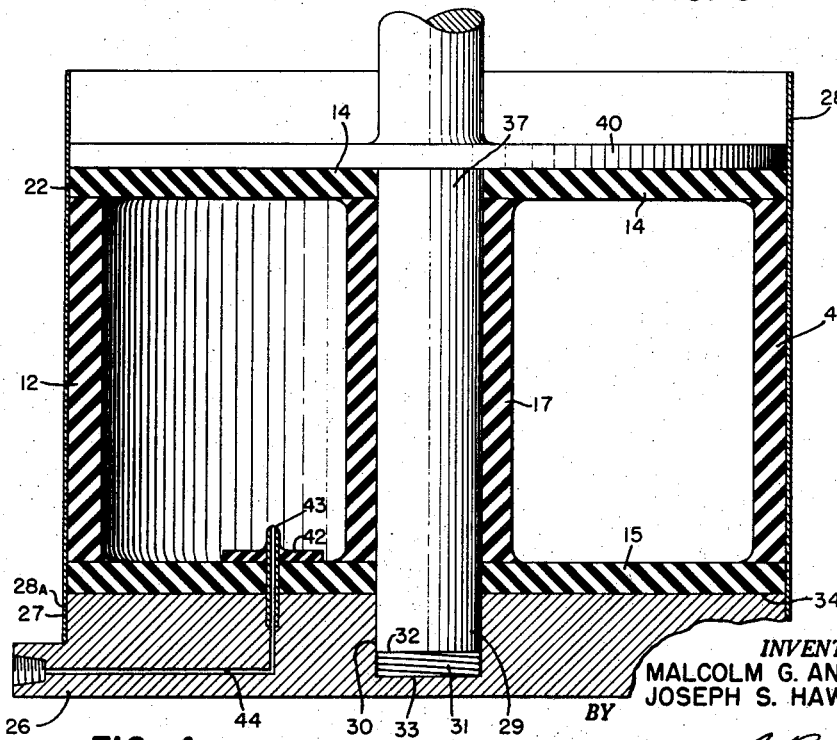
FIG. 4 is a view similar to FIG. 3 but showing the position of the apparatus after the stitching operation.
Figure 6:
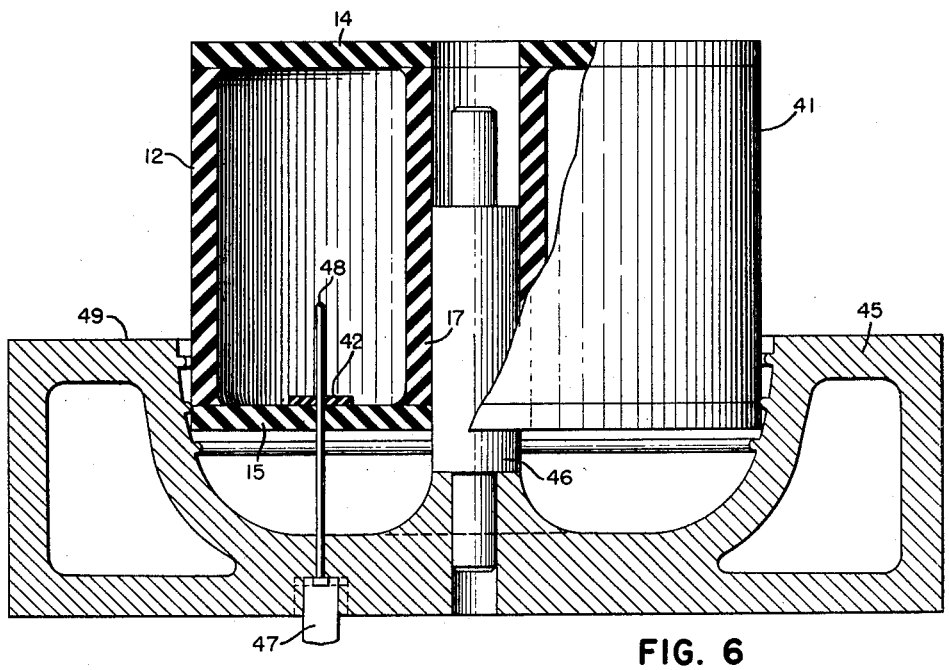
FIG. 6 is a longitudinal sectional view showing the green tire of this invention positioned between a tire curing mold.

With the component pieces of the tire formed as described above, the component pieces are assembled and spliced or stitched together in the apparatus shown in FIGS. 3 and 4 of the drawings. The apparatus consists of a base 26 having a circular flange 27 about which is positioned a housing 28, preferably made of sheet metal having ends which overlap circumferentially. The lower edge 28A of the housing 28 is wrapped around the circular flange 27 and the overlapping ends locked or latched together. A centering pin 29 extends from a bore 30 in the base 26 in a vertical direction and is concentrically disposed relative to the housing 28. A spring 31 is disposed between the base 32 of the pin 29 and the base 33 of the bore 30. In assembling and splicing the individual pieces of the tire, one of the disc-shaped pieces 15 is positioned on the bottom surface 34 of the base 26 with the pin 29 extending through the central hole thereof to align the disc 15 concentrically with the housing 28. The cylindrical piece 12 is then placed within the housing 28 so that the edge 18 is concentrically aligned with the peripheral edge 35 of the disc 15. Likewise, the cylindrical piece 17 is placed over the centering pin 29 so that the beveled edge 23 thereof is aligned with the peripheral edge 36 adjacent the central hole. Lastly, the ring-shaped piece 14 is placed over the upper end 37 of the pin 29 so that the peripheral edge 38 is concentrically disposed relative to the beveled surface 19 and the inner peripheral edge 39 is concentric with the beveled edge 23. With the pieces thus arranged, an axial force is applied to the plate 40 which moves the pin 29 towards the base 26 as well as compresses the ring-shaped piece 14 into engagement with the ends of the cylindrical pieces 17 and 12, and presses, in turn, the lower ends of the cylindrical pieces 12 and 17 into engagement with the disc 15. During the initial movement of the plate 40 towards the base 26, the axial outermost portions of the beveled surfaces initially contact, respectively, the discs 14 and 15 thereby initially sealing the respective pieces together to form an enclosed chamber. As the movement of the plate 40 continues, the beveled surfaces at the peripheral ends of the cylindrical pieces are progressively stitched or spliced toward the axial innermost edge thereof to thereby prevent any air from being entrapped in the spliced areas. After the stitching operation the plate 40 is removed, the housing is expanded slightly by unlatching the ends and the carcass 41 is removed for curing.

In the event that the dimensions of the tire being built are great enough or the flexibility of one or more pieces forming the tire is such that the disc 14 would sag, or the cylindrical pieces 12 and 17 would not support themselves, or the disc 14, the piece 15 may be provided with an all rubber sidewall valve 42 through which a needle valve 43 may extend. The needle valve 43 may be suitably secured to the base 26 and provided with a channel 44 communicating with a suitable source of fluid which may be injected through the valve 42 so that the pieces forming the tire are held by suitable fluid pressure in proper position during the forming operation.

After the tire carcass 41 has been built in the manner described above, the green carcass 41 is placed in a suitable mold section 45 having a central pin 46 for centering the tire relative thereto. The tire may be inflated during the molding operation by providing the mold section 45 with a bayonet valve 47 which extends through the sidewall valve 42 of the tire and terminates at 48 above the parting surface 49 of the mold. Thereafter, the upper section 50 of the mold is brought into position and the tire thus cured.

Figure 5:
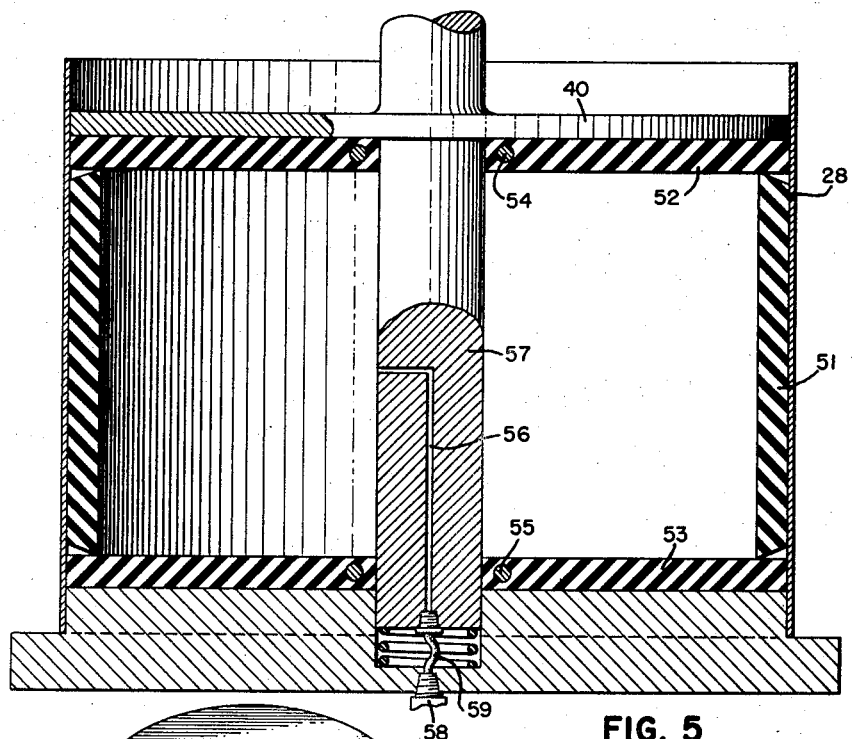
FIG. 5 is a longitudinal sectional view of another apparatus for carrying out the method of this invention to build a modification of the tire of this invention.

A modified form of the tire of this invention is shown in FIG. 5 of the drawings together with a modified form of apparatus for building the tire. As shown in FIG. 5, an open-bellied type pneumatic tire may be made wherein the tread is formed of a cylindrical piece 51 in a shape similar to the piece 12 shown in FIG. 1. The sidewall pieces 52 and 53 have a shape similar to the sidewall pieces 14 and 15 shown in FIG. 1, except that each may be provided in its inner periphery with a wire bead ring or hoop 54 and 55. The apparatus shown in FIG. 5 is identical to that shown in FIG. 3 except that air may be injected into the chamber through a channel 56 extending through the centering pin 57 and communicating with a suitable inlet 58 by way of a flexible hose 59 during the stitching operation.

While certain representative embodiments and details have been shown for the purpose of illustrating the invention, it will be apparent to those skilled in this art that various changes and modifications may be made therein without departing from the spirit or scope of the invention.

What is claimed is:

1. A method of making pneumatic tires comprising, forming two circular pieces and one cylindrical piece of rubber, bevelling the ends of said cylindrical piece so that the length thereof at the internal diameter is greater than the length thereof at the external diameter, placing one of said circular pieces concentrically in contact with each beveled end of said cylindrical piece, applying force against said circular pieces in a direction axially of said cylindrical piece to stitch the beveled ends of said cylindrical piece to the circular pieces to form a green tire, and curing said green tire in a mold.

2. A method as claimed in claim 1 in which each of said circular pieces is formed with a circular hole concentric with the periphery thereof and an inextensible bead ring is embedded in the rubber of said disc concentric and adjacent to said hole.

3. A method as claimed in claim 1 in which one of said discs is formed with an inflating valve therethrough, said pieces are enclosed in a cylindrical chamber and air is injected through said valve prior to the application of said compressive force.

4. A method as claimed in claim 1 in which said pieces are positioned within an enclosure prior to the application of said force and air is injected into said chamber.

5. A method as claimed in claim 1 in which an additional cylindrical piece of rubber is formed having a smaller diameter than said one cylindrical piece of rubber, the ends of said additional cylindrical piece being beveled so that the axial length of the external diameter thereof is greater than the axial length of the internal diameter thereof, said additional piece being placed in contact with and concentrically disposed with said two discs.

References Cited in the file of this patent

UNITED STATES PATENTS

| | | |
|---|---|---|
| 493,160 | Golding | Mar. 7, 1893 |
| 502,390 | Wright | Aug. 1, 1893 |
| 1,542,791 | Veil-Picard | July 16, 1925 |
| 1,576,024 | Barrantes et al. | Mar. 9, 1926 |
| 1,580,267 | Nelson | Apr. 13, 1926 |
| 1,875,643 | Musselman | Oct. 4, 1929 |
| 2,599,176 | Henry | June 3, 1952 |
| 2,713,373 | Daugherty | July 19, 1955 |
| 2,952,292 | Olsen | Sept. 13, 1960 |